(12) United States Patent
Kitamura et al.

(10) Patent No.: US 7,874,045 B2
(45) Date of Patent: Jan. 25, 2011

(54) HINGE DEVICE

(75) Inventors: Yoshiharu Kitamura, Aikawa-machi (JP); Makoto Saito, Miyata-mura (JP); Yohei Nakahara, Miyata-mura (JP)

(73) Assignee: NHK Spring Co., Ltd., Kanagawa (JP)

( * ) Notice: Subject to any disclaimer, the term of this patent is extended or adjusted under 35 U.S.C. 154(b) by 958 days.

(21) Appl. No.: 10/596,145

(22) PCT Filed: Nov. 22, 2004

(86) PCT No.: PCT/JP2004/017351

§ 371 (c)(1), (2), (4) Date: Apr. 11, 2007

(87) PCT Pub. No.: WO2005/054695

PCT Pub. Date: Jun. 16, 2005

(65) Prior Publication Data

US 2007/0266524 A1    Nov. 22, 2007

(30) Foreign Application Priority Data

Dec. 4, 2003    (JP)    ............... 2003-405922

(51) Int. Cl.
*E05C 17/64* (2006.01)
(52) U.S. Cl. .............. 16/337; 16/297; 16/334; 16/388
(58) Field of Classification Search .......... 16/337, 16/342, 344, 388, 280, 297, 303, 334; 361/679.27; 379/433.13; 455/575.3; 248/919–923
See application file for complete search history.

(56) References Cited

U.S. PATENT DOCUMENTS

| | | | | |
|---|---|---|---|---|
| 5,109,570 A | * | 5/1992 | Okada et al. ............. | 16/289 |
| 5,894,633 A | * | 4/1999 | Kaneko ................... | 16/306 |
| 5,940,936 A | * | 8/1999 | Lu .......................... | 16/337 |
| 5,966,776 A | * | 10/1999 | Ona ........................ | 16/328 |
| 5,970,580 A | * | 10/1999 | Katoh ..................... | 16/337 |
| 6,125,507 A | * | 10/2000 | Katoh ..................... | 16/329 |
| 6,539,582 B1 | * | 4/2003 | Chae ....................... | 16/340 |
| 6,568,034 B2 | * | 5/2003 | Cho ........................ | 16/337 |
| 6,633,643 B1 | | 10/2003 | Ona | |
| 6,918,159 B2 | * | 7/2005 | Choi ....................... | 16/347 |

FOREIGN PATENT DOCUMENTS

| | | |
|---|---|---|
| EP | 1203890 | 5/2002 |
| JP | 10-68412 | 3/1989 |

(Continued)

*Primary Examiner*—William L. Miller
(74) *Attorney, Agent, or Firm*—McGlew and Tuttle, P.C.

(57) ABSTRACT

Provided is a hinge device for connecting one member and another member so that the hinge device allows opening and closing, including: a movable shaft; a first bracket non-rotatably fixed to the movable shaft and fixed to the one member; a second bracket rotatably and axially movably installed on the movable shaft and fixed to the other member; and a plate spring member formed in a curved configuration, having at a top of the curved configuration of the plate spring member a projection whose surface in contact with the second bracket is flat, and non-rotatably and axially movably installed on the movable shaft, in which the second bracket and the plate spring member are pressed against and held in contact with each other and make relative rotation.

11 Claims, 14 Drawing Sheets

FOREIGN PATENT DOCUMENTS

| | | |
|---|---|---|
| JP | 9-329127 | 12/1997 |
| JP | 10252739 | 9/1998 |
| JP | 11044142 | 2/1999 |
| JP | 11-173327 | 6/1999 |
| JP | 200159373 | 3/2001 |
| JP | 2001-107941 | 4/2001 |
| JP | 2001-185868 | 7/2001 |
| JP | 2002258695 | 9/2002 |
| JP | 2003-156029 | 5/2003 |
| JP | 2003-161311 | 6/2003 |
| JP | 2004-190785 | 7/2004 |
| WO | WO 00/77413 | 12/2000 |

* cited by examiner (a)

(b)

(a)

(b)

(a)

(b)

(a)

(b)

(c)

(a)

(b)

(c)

(a)

(b)

(c)

HINGE DEVICE

TECHNICAL FIELD

The present invention relates to a hinge device for connecting two members like a main body and a cover member, for example, of a small OA apparatus or a portable terminal apparatus, such as a notebook computer or a mobile phone, and of a toilet seat cover so as to allow opening and closing.

BACKGROUND ART

In an information apparatus, such as a notebook computer or a mobile phone, a keyboard is provided, for example, in a main body, and a display device is provided, for example, in a cover member, with the cover member provided with the display device being connected by a hinge device so that it can be opened/closed, stopped and retained at an angular position where it can be easily seen. Conventionally, such the hinge device has a pair of cams arranged with their axes matched with each other so as to allow relative rotation and movement toward and away from each other, with the cam surfaces of these cams being urged by springs to be held in intimate contact with each other; through their relative rotation, the two cams make relative movement along their axes, changing the angular relationship between the two cams (see, for example, Patent Documents 1 and 2).

Patent Document 1: JP 10-252739 A
Patent Document 2: JP 11-44142 A

DISCLOSURE OF THE INVENTION

Problems to be Solved by the Invention

The above-described conventional hinge device is sufficiently endowed with a function to effect opening/closing, stopping, retaining, etc. of the display device (cover member). However, the conventional hinge device has a large number of components and a rather complicated structure. Thus, its production takes time and effort and involves a high production cost. Further, a cam member and a sliding cam member (the above-mentioned two cams) are provided with cam portions to be fit-engaged with each other, so there is a limit to a reduction in the axial size (length) of the device.

The present invention has been made in view of such the above-mentioned problems. It is an object of the present invention to provide a hinge device which has a simple structure, whose number of components is small, which is easy to assemble, which allows a reduction in weight and size, which can generate a requisite torque and a tactile feel even when formed in a small size, and which is inexpensive.

Means for Solving the Problems

According to the present invention, a hinge device for connecting one member and another member so that the hinge device allows opening and closing, includes: a movable shaft; a first bracket non-rotatably fixed to the movable shaft and fixed to the one member; a second bracket rotatably and axially movably installed on the movable shaft and fixed to the other member; and a plate spring member formed in a curved configuration, having at a top of the curved configuration of the plate spring member a projection whose surface in contact with the second bracket is flat, and non-rotatably and axially movably installed on the movable shaft, and is characterized in that the second bracket and the plate spring member are pressed against and held in contact with each other and make relative rotation.

With this construction, the movable shaft rotates when one member is opened or closed, with the first bracket being fixed to the one member, and the second bracket being fixed to the other member. In this case, the plate spring member is non-rotatably and axially movably installed on the movable shaft, so the plate spring member rotates together with the movable shaft, whereas the second bracket, which is axially movable, does not rotate if the movable shaft rotates. The plate spring member and the second bracket are pressed against and held in contact with each other, so, as a result of the rotation of the plate spring member due to the rotation of the movable shaft, the plate spring member and the second bracket are pressed against and held in contact with each other to make relative rotation. Thus, there is generated a rotational torque due to a mutual frictional force. In particular, the plate spring member is formed in the curved configuration, and has at the top of the curved portion the projection whose surface in contact with the second bracket is flat, so, when it rotates while in sliding contact with the second bracket, the plate spring member is compressed to be deformed, and an urging force thereof is exerted, resulting in an increase in frictional force and generation of a large rotational torque. Due to this rotational torque, it is possible to control the opening and closing of the one member and the other member. For example, when the one member constituting a cover member is opened and closed with respect to the other member constituting a main body, the rotational torque due to the mutual frictional force is generated between the plate spring member and the second bracket, and, due to the rotational torque, it is possible to effect opening/closing, stopping and retaining of the cover member.

Further, the surface of the projection of the plate spring member which is in contact with the second bracket is flat, so the contact area increases, and it is possible to increase the rotational torque; further, it is possible to reduce wear of the projection and the second bracket, thereby achieving an improvement in terms of durability.

Further, according to the present invention, a hinge device for connecting one member and another member so that the hinge device allows opening and closing, includes: a movable shaft; a first bracket non-rotatably fixed to the movable shaft and fixed to the one member; a second bracket rotatably and axially movably installed on the movable shaft and fixed to the other member; a plate spring member formed in a curved configuration, having at a top of the curved configuration of the plate spring member a projection whose surface in contact with the second bracket is flat, and non-rotatably and axially movably installed on the movable shaft; and a friction member rotatably and axially movably installed on the movable shaft, and is characterized in that the plate spring member and the friction member are installed so that the plate spring member and the friction member sandwich the second bracket and are pressed against and held in contact with the second bracket and make relative rotation with respect to each other.

With this construction, the movable shaft rotates when the one member is opened or closed, with the first bracket being fixed to the one member, and the second bracket being fixed to the other member. In this case, the plate spring member and the friction member are non-rotatably and axially movably installed on the movable shaft so as to sandwich the second bracket, so they rotate together with the movable shaft; on the other hand, while the second bracket is axially movable, it does not rotate even when the movable shaft rotates. The plate spring member is pressed against and held in contact with one side of the second bracket, and the friction member is pressed against and held in contact with the other side of the second bracket, so, as a result of the rotation of the plate spring member and the friction member due to the rotation of the movable shaft, the plate spring member and the friction member, and the second bracket make relative rotation while being pressed against and held in contact with each other. As a result, there is generated a rotational torque due to a mutual frictional force. In the present invention, the rotational torque due to the frictional force is generated between the plate spring member and the second bracket and between the friction member and the second bracket, so the rotational torque is large. Further, the plate spring member is formed in a curved configuration, and has at the top of the curved portion a projection whose surface in contact with the second bracket is flat. Therefore, when the plate spring member rotates while in sliding contact with the second bracket, the plate spring member is compressed and deformed, and an urging force thereof is exerted, resulting in an increase in frictional force and generation of a large rotational torque. Due to the rotational torque generated, it is possible to control the opening/closing of the one member and the other member. For example, it is possible to open/close, stop, and retain these members.

Further, the surface of the projection of the plate spring member which is in contact with the second bracket is flat, so the contact area increases, and it is possible to increase the rotational torque; further, it is possible to reduce a wear of the projection and the second bracket, thus making it possible to achieve an improvement in terms of durability.

Further, according to the present invention, a hinge device is characterized in that the second bracket, which is pressed against, held in contact, and make the relative rotation with the plate spring member, is provided with one or a plurality of recesses, holes, or cutouts in which the projection of the plate spring member drops, and that a tactile feel is generated when the projection of the plate spring member is matched with the recesses, holes, or the cutouts as the second bracket and the plate spring member make relative rotation while pressed against and held in contact with each other.

With this construction, the plate spring member is pressed against and held in contact with the second bracket, so, as a result of the rotation of the plate spring member due to the rotation of the movable shaft, the plate spring member and the second bracket make relative rotation while pressed against and held in contact with each other, with the result that there is generated rotational torque due to the mutual frictional force. When they are caused to further rotate, the projection of the plate spring member is matched with the recess, hole, or cutout (hereinafter referred to as recess or the like) of the second bracket, and drops in the recess or the like, whereby the rotational torque is changed. That is, the rotational torque due to the mutual frictional force is a rotational torque resulting from compression and deformation of the curved plate spring member through the intermediation of the projection and from exertion of the resultant urging force, so, when the projection of the plate spring member drops in the second bracket, the deformation of the plate spring member becomes so much the less, and the resultant pressing force (urging force) is smaller.

As a matter of course, for the projection of the plate spring member to be restored from the state in which it has been fitted (dropped) in the recess or the like of the second bracket to a former state, that is, onto the plane of the second bracket, a large rotational torque (operating force) is required. When the projection of the plate spring member thus drops in the recess or the like of the second bracket and is restored to the former state, the rotational torque is changed. In other words, a "tactile feel" is generated. Thus, in the present invention, it is possible to control the opening/closing of the one member and the other member through rotational torque, and it is also possible to generate the tactile feel at a predetermined point in the course of opening/closing.

Further, according to the present invention, a hinge device is characterized in that the plate spring member is non-rotatably and axially movably installed on the movable shaft so that the plate spring member sandwiches the second bracket from both sides.

With this construction, the plate spring members pressed against and held in contact with the second bracket to make relative rotation exist on both sides of the second bracket, so it is possible to generate the rotational torque due to the mutual frictional force on both sides of the second bracket.

Further, according to the present invention, a hinge device is characterized in that the plate spring member has at the top of the curved configuration of the plate spring member at least two projections whose surfaces in contact with the second bracket are flat, with areas of the flat portions being different from projection to projection.

With this construction, it is possible to add to the contact area with respect to the second bracket, and to increase and change the rotational torque due to the frictional force; further, it is possible to form a projection which drops in the recesses or the like of the second bracket and a projection which passes without dropping. Thus, even when the plate spring member is provided with a plurality of projections, no tactile feel is generated when all of them are matched with the recesses or the like, thus making it possible to make the generation of the tactile feel selective.

Further, according to the present invention, a hinge device is characterized in that the plate spring member is provided with a reinforcing plate spring member stacked on the plate spring member.

With this construction, it is possible to achieve an increase in rotational torque, and to vary the rotational torque by changing the number of reinforcing plate spring members stacked. Further, by making the spring force (load) and the deformation amount of the plate spring member different from those of the reinforcing plate spring member, an operational sharing can be effected. For example, it is possible to use a plate spring member whose spring force is large but whose deformation amount is small, and to use a reinforcing plate spring member whose spring force is small but whose deformation amount is large, with the portion needing deformation (e.g., the portion where the projection of the plate spring member drops in the recess or the like of the second bracket to generate the tactile feel) being mainly assigned to the reinforcing plate spring member, and the portion needing rotational torque (e.g., the portion where the rotational torque for the opening/closing, stopping, and retaining of the cover member is generated) being mainly assigned to the plate spring member.

EFFECTS OF THE INVENTION

A hinge device of the present invention provides the following effects:

(1) A plate spring member composed, for example, of a spring washer, serves as both a spring and cam members of the prior art technique, so one cam member becomes unnecessary, which means the number of components is so much the less and the structure is simplified.

(2) As a result of the reduction in the number of components and the simplification in structure, the assembly does not take time and effort, thereby being facilitated; further, the assembly can be effected with high precision, and an improvement in terms of quality can be achieved.

(3) With the simple structure, the production is facilitated; further, due to the reduction in the number of components, the device as a whole becomes less expensive.

(4) With the simple structure and the reduction in the number of components and due to the formation of the main portion by using a plate member, it is possible to achieve a further reduction in weight and size. Further, with the stacked structure of the plate member, no increase in size is involved, and torque amplification is possible.

(5) A surface of a projection of the plate spring member which is in contact with a second bracket is flat, a contact area increases, and it is possible to increase a rotational torque; further, wear of the projection and the second bracket is reduced, thereby achieving an improvement in terms of durability. Further, by varying the area of the flat surface of each projection, it is possible to vary the rotational torque and to make selective the generation of the tactile feel when causing the projection to drop in the recess or the like of the second bracket.

(6) Load characteristics and the rotational torque can be arbitrarily set, so the device can be used not only as a hinge device for an opening/closing member but is applicable to a wide range of fields as a hinge device of which various balance characteristics, etc. are required.

(7) Through appropriate formation of the curved portion of the plate spring member, it is possible to realize a smooth variation in rotational torque.

BEST MODES FOR CARRYING OUT THE INVENTION

The hinge device of the present invention will be described in more detail with reference to the accompanying drawings.

Figure 1:
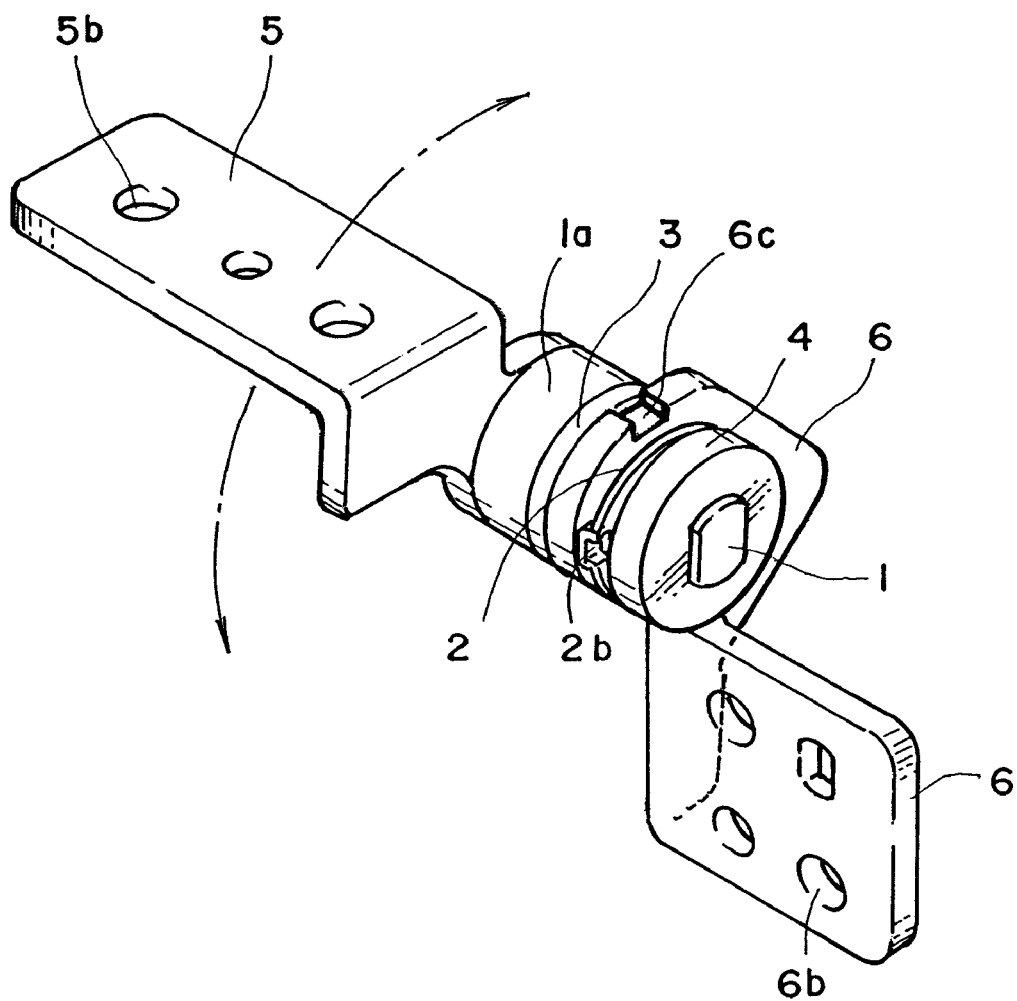
FIG. 1 is a perspective view of a hinge device according to a first embodiment of the present invention.
Figure 2:
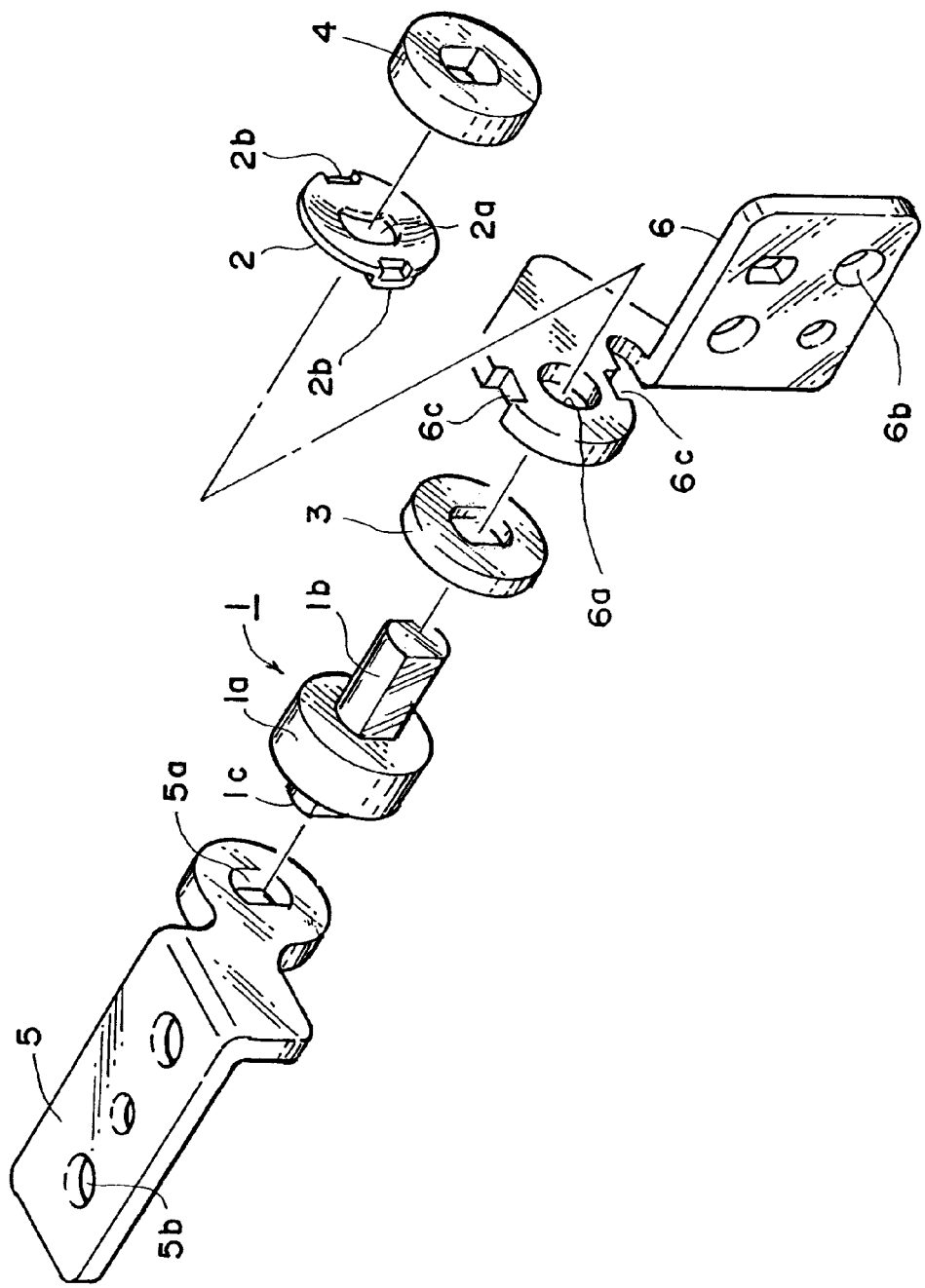
FIG. 2 is an exploded perspective view of the hinge device of the first embodiment of the present invention.

FIG. 1 is a perspective view of a hinge device according to a first embodiment of the present invention, and FIG. 2 is an exploded perspective view of the hinge device of the first embodiment of the present invention.

This hinge device is composed of a movable shaft 1, a first bracket 5 non-rotatably fixed to the movable shaft 1 and fixed to one member, e.g., a cover member, a second bracket 6 rotatably and axially movably installed on the movable shaft 1 and fixed to the other member, e.g., a main body, a spring washer 2 as a plate spring member formed in a curved configuration, having projections 2b at a top of the curved portion thereof, and non-rotatably and axially movably installed on the movable shaft 1, and a friction washer 3 non-rotatably and axially movably installed on the movable shaft 1, with the second bracket 6 and the spring washer 2 being regulated in their movement in the axial direction by a presser washer 4 and pressed against and held in contact with each other.

While it is constrained in rotation (made non-rotatable) by the movable shaft 1, the spring washer 2 as the plate spring member is installed so as to be axially movable, so it rotates together with the movable shaft 1 and is capable of axial movement.

The first bracket 5 is non-rotatably fixed to the movable shaft 1, so it rotates together with the movable shaft 1. The second bracket 6 is rotatably and axially movably installed on the movable shaft 1, so it does not rotate if the movable shaft 1 rotates, and is capable of axial movement.

Figure 3:
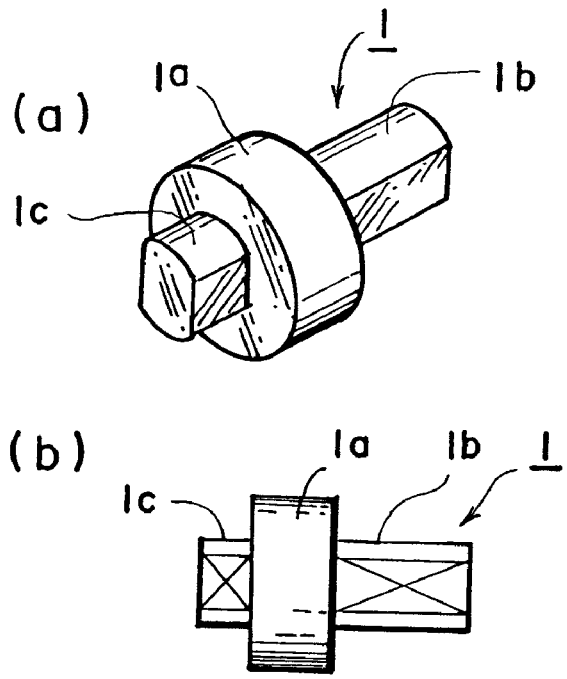
FIG. 3($a$) is a perspective view and FIG. 3($b$) is a front view of a movable shaft.

The embodiment will be described in more detail. First, FIG. 3 shows the movable shaft 1. FIG. 3($a$) is a perspective view and FIG. 3($b$) is a front view of the movable shaft. The movable shaft 1 is composed of a flange portion 1a, a main shaft portion 1b, and a support shaft portion 1c. The main shaft portion 1b and the support shaft portion 1c have a non-circular sectional configuration. In this embodiment, they are of a W-D configuration.

Figure 4:
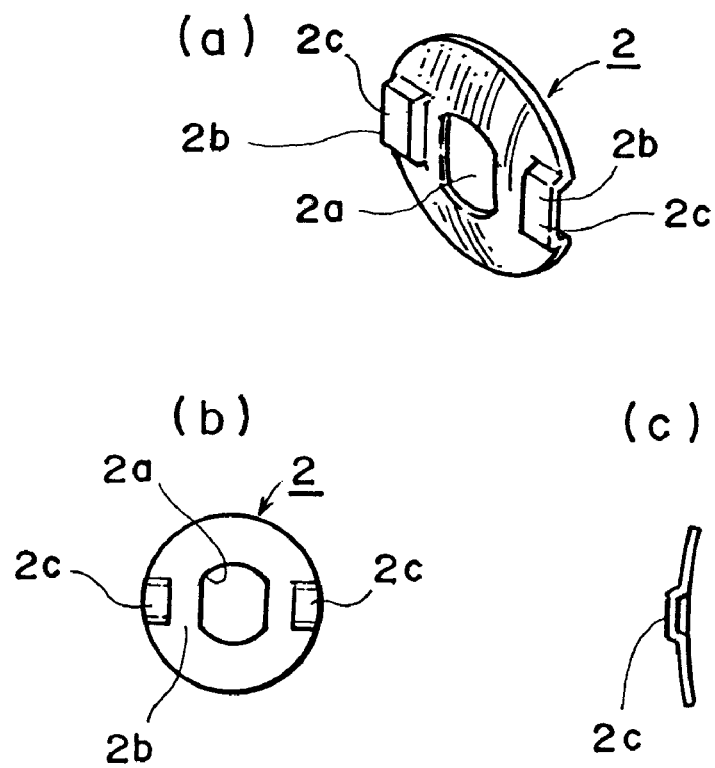
FIG. 4($a$) is a perspective view, FIG. 4($b$) is a front view, and FIG. 4($c$) is a side view of a spring washer.

FIG. 4($a$) is a perspective view, FIG. 4($b$) is a front view, and FIG. 4($c$) is a side view of the spring washer. The spring washer 2 is formed in a circular configuration of a plate spring material; it has at its center a non-circular hole 2a, and is formed in a curved (not conical) configuration, with projections 2b being provided at the top of the curved portion thereof. The top surfaces of the projections 2b are formed as flat portions 2c, and, in this embodiment, the two projections 2b are situated at symmetrical positions (at an interval of 180°). The non-circular hole 2a is formed as a non-circular hole of a W-D configuration corresponding to the non-circular sectional configuration of the main shaft portion 1b of the movable shaft 1, and the spring washer 2 is non-rotatably and axially movably fitted onto the main shaft portion 1b of the movable shaft 1, and rotates together with the movable shaft 1.

Figure 5:
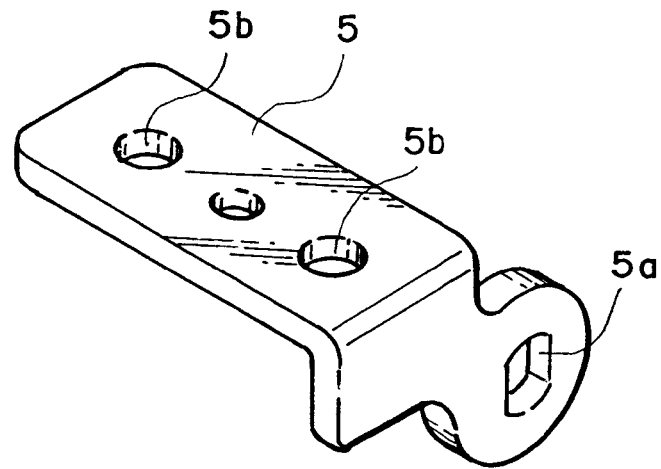
FIG. 5 is a perspective view of a first bracket.

FIG. 5 is a perspective view of the first bracket; the first bracket 5 is equipped with a non-circular hole 5a and screw holes 5b for screw-fixation to one member, for example, a cover member. The non-circular hole 5a is formed as a non-circular hole of a W-D configuration corresponding to the non-circular sectional configuration of the support shaft portion 1c of the movable shaft 1, and the first bracket 5 is non-rotatably fitted onto the support shaft portion 1c of the movable shaft 1, rotating together with the movable shaft 1.

Figure 6:
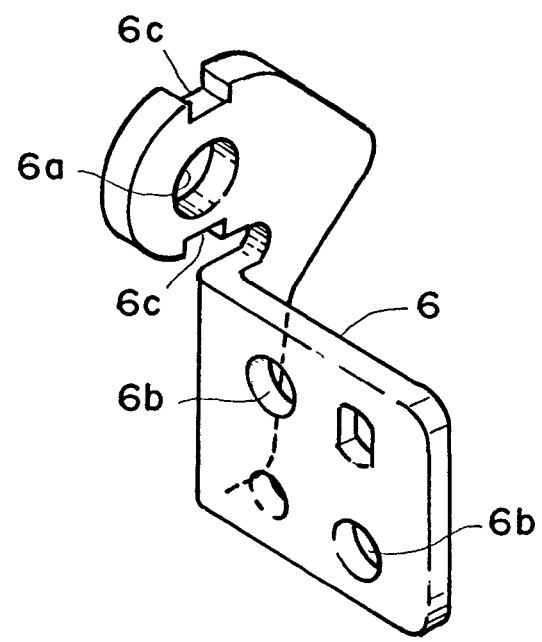
FIG. 6 is a perspective view of a second bracket.

FIG. 6 is a perspective view of the second bracket. The second bracket 6 has a circular hole 6a corresponding to the main shaft portion 1b of the movable shaft 1, and is rotatably and axially movably fitted onto the main shaft portion 1b of the movable shaft 1. Further, the second bracket 6 is equipped with cutouts 6c serving as recesses or the like in which the projections 2b of the spring washer 2 are to drop, and screw holes 6b for screw-fixation to the other member, for example, a main body.

Figure 7:
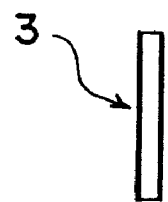
FIG. 7($a$) is a side view and FIG. 7($b$) is a front view of a friction washer.
Figure 7:
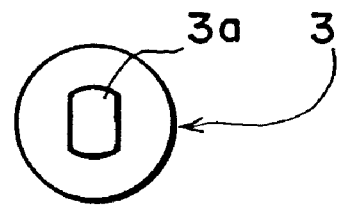

FIG. 7(a) is a side view and FIG. 7(b) is a front view of a friction washer. The friction washer 3 is composed of a circular plate member, and has at its center a non-circular hole 3a of a W-D configuration corresponding to the main shaft portion 1b of the movable shaft 1; it is fitted onto the main shaft portion 1b of the movable shaft 1, and rotates together with the movable shaft 1.

Next, a method of assembling the above components will be described. First, the non-circular hole 5a of the first bracket 5 is fitted onto the support shaft portion 1c of the movable shaft 1, and an end portion of the support shaft portion 1c is crimped, whereby the first bracket 5 is fixed to the support shaft portion 1c of the movable shaft 1. Next, the friction washer 3, the second bracket 6, the spring washer 2, and a presser washer 4 are fitted in that order onto the main shaft portion 1b of the movable shaft 1, and the end portion of the main shaft portion 1b is crimped for detachment prevention. At this time, the spring washer 2 is crimped in a deformed state, that is, in a state in which the friction washer 3 and the spring washer 2 are pressed against and held in contact with the side surfaces of the second bracket 6. In this way, a hinge device as shown in FIG. 1 is assembled.

In the hinge device of the first embodiment shown in FIG. 1, the first bracket 5 is fixed to one member, for example, a cover member, and the second bracket 6 is fixed to the other member, for example, a main body. When the cover member (one member) is opened or closed with respect to the main body (the other member), the movable shaft 1 rotates with respect to the second bracket 6 (main body) since the first bracket 5 is non-rotatably fixed to the movable shaft 1. In the rotation of the movable shaft 1, the spring washer 2 and the friction washer 3 rotate together since the spring washer 2 and the friction washer 3 are non-rotatably and axially movably fitted onto the movable shaft 1, whereas the second bracket 6 does not rotate since it is rotatably fitted onto the movable shaft 1. At this time, the spring washer 2 and the friction washer 3 are pressed against and held in contact with both side surfaces of the second bracket 6, so the rotational torque is generated due to the mutual friction. Due to this rotational torque, it is possible to effect the opening/closing, stopping, and retaining of the cover member.

In particular, the spring washer 2 of the present invention is formed in a curved configuration, and has the projections 2b at the top of the curved portion thereof, so the spring washer 2 is pressed against and held in contact with the second bracket 6 through the intermediation of the projections 2b by the urging force (pressing force) due to its deformation; further, the surfaces of the projections 2b held in sliding contact with the second bracket 6 are formed as flat portions 2c, so it is possible to secure the requisite friction area, and the frictional force is increased, making it possible to generate a large rotational torque and to reliably control the opening/closing of the cover member.

Here, when the cover member (one member) is further rotated, the projections 2b of the spring washer 2 are matched with the cutouts 6c of the second bracket 6 and drop in the cutouts 6c, whereby the rotational torque is changed. That is, as a result of the projections 2b of the spring washer 2 dropping in the cutouts 6c of the second bracket 6, the deformation of the spring washer 2 diminishes, and the pressing force (urging force) is reduced. To restore the projections 2b of the spring washer 2 dropped in the cutouts 6c of the second bracket 6 onto the plane of the second bracket again, a large rotational torque (operating force) is required. By thus causing the projections 2b of the spring washer 2 to drop in the cutouts 6c of the second bracket 6 and restoring them onto the plane of the second bracket, the rotational torque is changed. In other words, a tactile feel is generated.

The position where this tactile feel is generated can be selected as appropriate according to the use. In the first embodiment, the projections 2b of the spring washer 2 and the cutouts 6c of the second bracket 6 are respectively provided at two symmetrical positions at an interval of 180°, so a tactile feel is generated for each 180° rotation. Thus, when a position where the tactile feel is to be generated is set, for example, at a position where the cover member is closed, it is possible to generate a force in a closing direction when closing the cover member; for example, when the device is applied to a notebook computer, it can replace a latch mechanism for keeping the cover member closed, so there is no need to provide the conventional latch mechanism, whereby the computer can be made more compact, and it is also possible to achieve an increase in the degree of freedom in terms of design.

Figure 8:
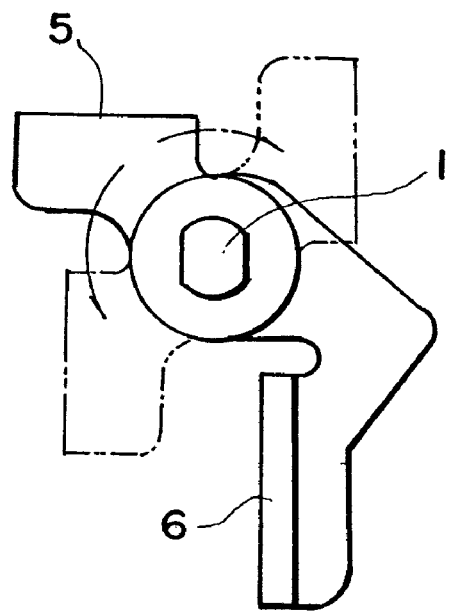
FIG. 8 is a side view showing how a projection of the spring washer is situated on a plane of the second bracket.
Figure 9:
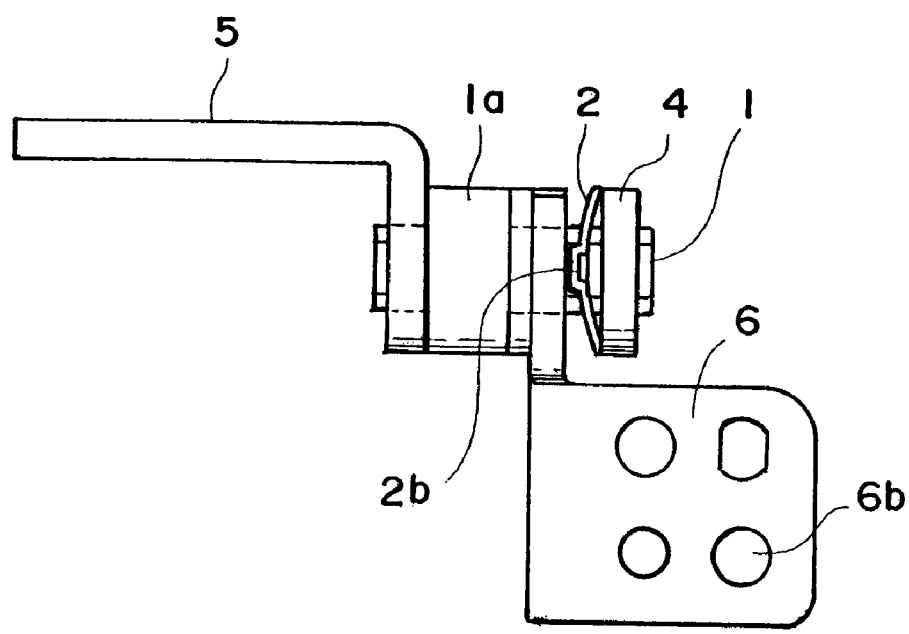
FIG. 9 is a front view showing how the projection of the spring washer is situated on the plane of the second bracket.
Figure 10:
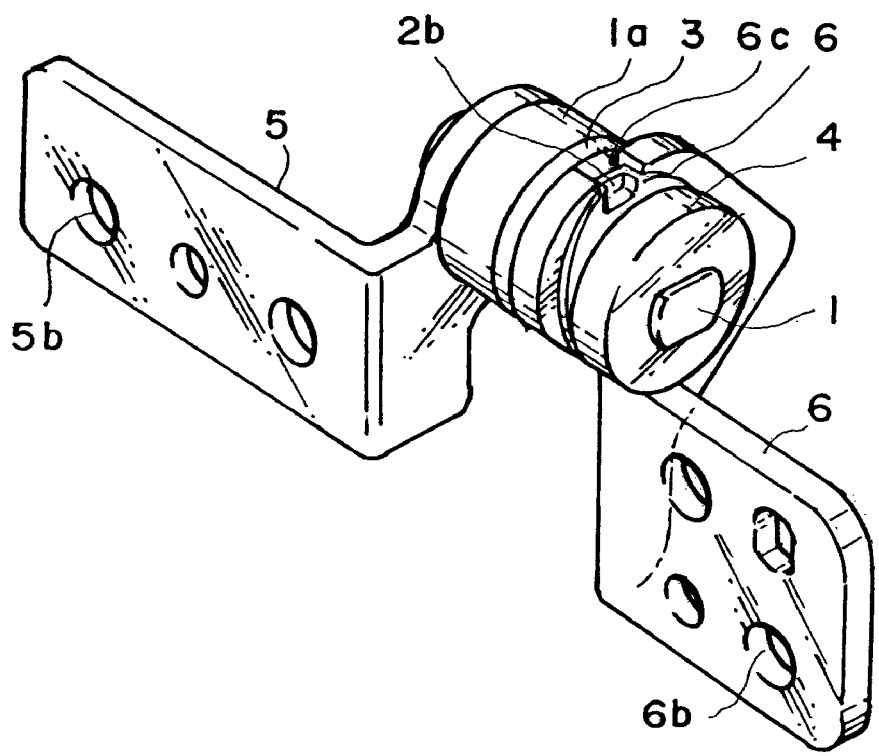
FIG. 10 is a perspective view showing how the projection of the spring washer is dropped in a recess or the like of the second bracket.
Figure 11:
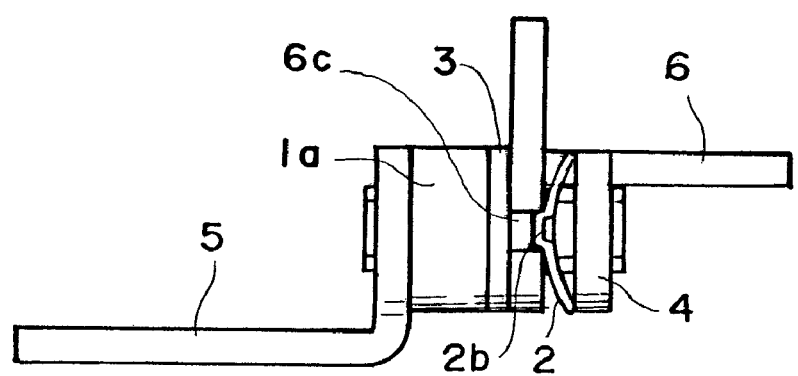
FIG. 11 is a plan view showing how the projection of the spring washer is dropped in the recess or the like of the second bracket.

FIGS. 8 and 9 are a side view and a front view showing how the projections 2b of the spring washer 2 are held in contact with the plane of the second bracket 6, and FIGS. 10 and 11 are a perspective view and a bottom view showing how the first bracket 5 is rotated to cause the projections 2b of the spring washer 2 to drop in the cutouts 6c of the second bracket 6.

Figure 12:
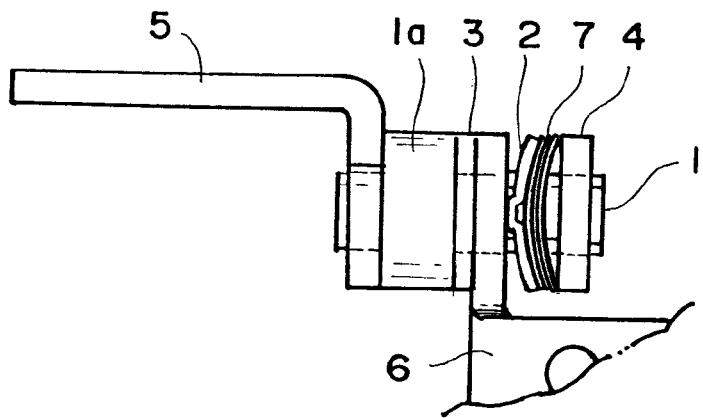
FIG. 12 ($a$) is a front view and FIG. 12($b$) is a plan view of a hinge device according to a second embodiment of the present invention.
Figure 12:
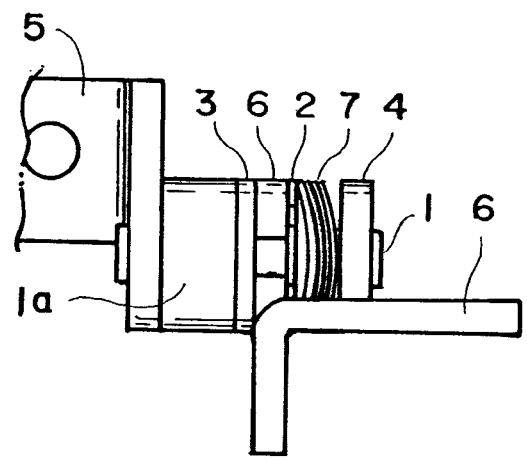

FIG. 12(a) is a front view and FIG. 12(b) is a plan view of a hinge device according to a second embodiment of the present invention. In this embodiment, reinforcing spring washers 7 serving as reinforcing plate spring members are stacked on the spring washer 2 of the first embodiment; otherwise, this embodiment is the same as the first embodiment, so the same components are indicated by the same reference numerals, and a detailed description thereof will be omitted.

Figure 13:
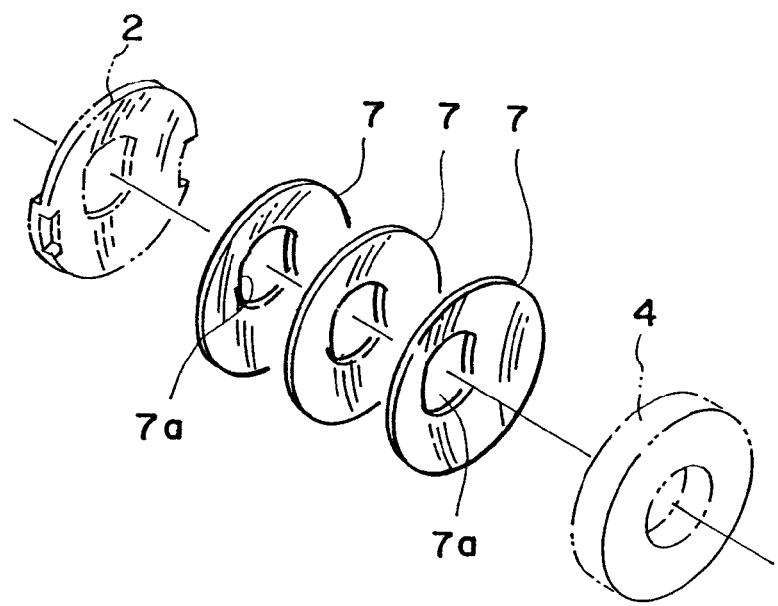
FIG. 13 is an exploded perspective view of a reinforcing spring washer portion.
Figure 14:
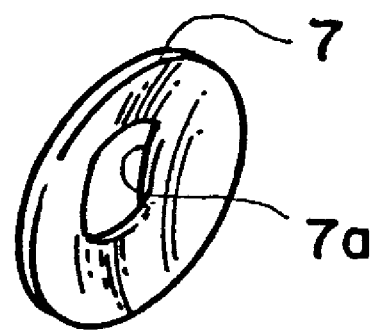
FIG. 14 ($a$) is a perspective view and FIG. 14($b$) is a central longitudinal sectional view of a reinforcing spring washer.
Figure 14:
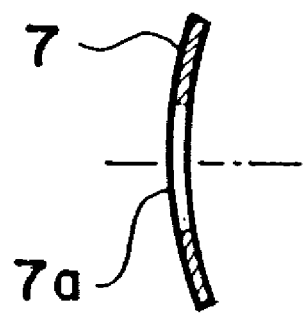

FIG. 13 is an exploded perspective view of a reinforcing washer portion. FIG. 14(a) is a perspective view and FIG. 14(b) is a central longitudinal sectional view of a reinforcing spring washer. The reinforcing spring washer 7 is formed in a circular configuration, and has at its center a non-circular hole 7a corresponding to the non-circular sectional configuration of the main shaft portion 1b of the movable shaft 1; it is non-rotatably and axially movably fitted onto the main shaft portion 1b of the movable shaft 1, and is stacked on the spring washer 2. As shown in FIG. 13, in this embodiment, three reinforcing spring washers are stacked. Further, as shown in FIG. 14, the reinforcing spring washer 7 is formed in a curved (non-conical) configuration. That is, it is of a configuration similar to that of the spring washer 2 except that it has no projections 2b.

In the second embodiment, due to the presence of the reinforcing spring washers 7, there is generated rotational torque due to the frictional force generated through application of a pressing (urging force); further, by changing the number of reinforcing spring washers stacked together, it is possible to change the rotational torque. Further, by varying the thickness, spring force, deformation amount, etc. of the spring washer 2 and the reinforcing spring washers 7, it is also possible to realize an operational sharing. For example, by making the thickness of the reinforcing spring washers 7 smaller than that of the spring washer 2, and by using a spring washer 2 whose spring force is large but whose deformation amount is small and reinforcing spring washers 7 whose spring force is small but whose deformation amount is large, it is possible, for example, to assign a portion where deformation is needed, e.g., the portion where the projections 2b of the spring washer 2 drop in the cutouts 6c of the second bracket 6 to generate a tactile feel, mainly to the reinforcing spring washers 7, and to assign a portion where rotational torque is needed, e.g., the portion where the projections 2b of the spring washer 2 are held in contact with the plane of the second bracket 6 and where there is generated the rotational torque for effecting the opening/closing, stopping, and retaining of the cover member, mainly to the spring washer 2.

FIG. 15(a) is a side view, FIG. 15(b) is a front view, and FIG. 15(c) is a bottom view of a hinge device according to a third embodiment of the present invention. In this embodiment, the number of projections of the spring washer and the number of cutouts of the second bracket in the first embodiment are changed; otherwise, this embodiment is the same as the first embodiment described above, so the same components are indicated by the same reference numerals, and a detailed description thereof will be omitted.

Figure 16:
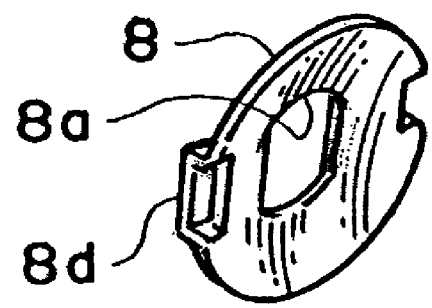
FIG. 16($a$) is a perspective view, FIG. 16($b$) is a front view, and FIG. 16($c$) is a side view of a spring washer according to the third embodiment of the present invention.
Figure 16:
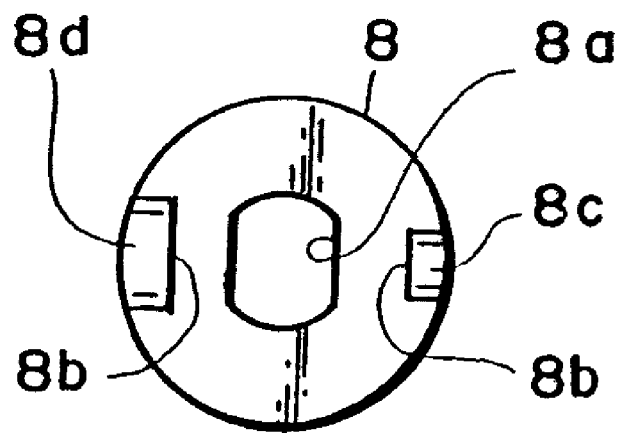
Figure 16:
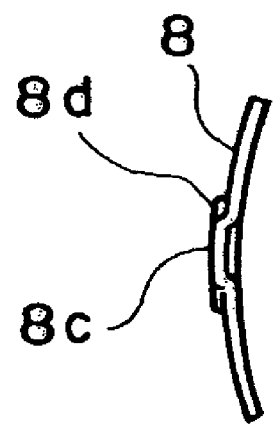

FIG. 16(a) is a perspective view, FIG. 16(b) is a front view, and FIG. 16(c) is a side view of a spring washer. The spring washer 8 is formed in a circular configuration of a plate spring material, and has at its center a non-circular hole 8a and is formed in a curved (non-conical) configuration, with two projections 8b being provided at the top of the curved portion. The two projections 8b are provided at symmetrical positions (at an interval of 180°), and the top surfaces of the projections 8b are formed as flat portions 8c, 8d, with the flat portions 8c and 8d having different areas. Further, the non-circular hole 8a is formed as a non-circular hole 8a of a W-D configuration corresponding to the non-circular sectional configuration of the main shaft portion 1b of the movable shaft 1; the spring washer 8 is non-rotatably and axially movably fitted onto the main shaft portion 1b of the movable shaft 1, and rotates together with the movable shaft 1.

Figure 17:
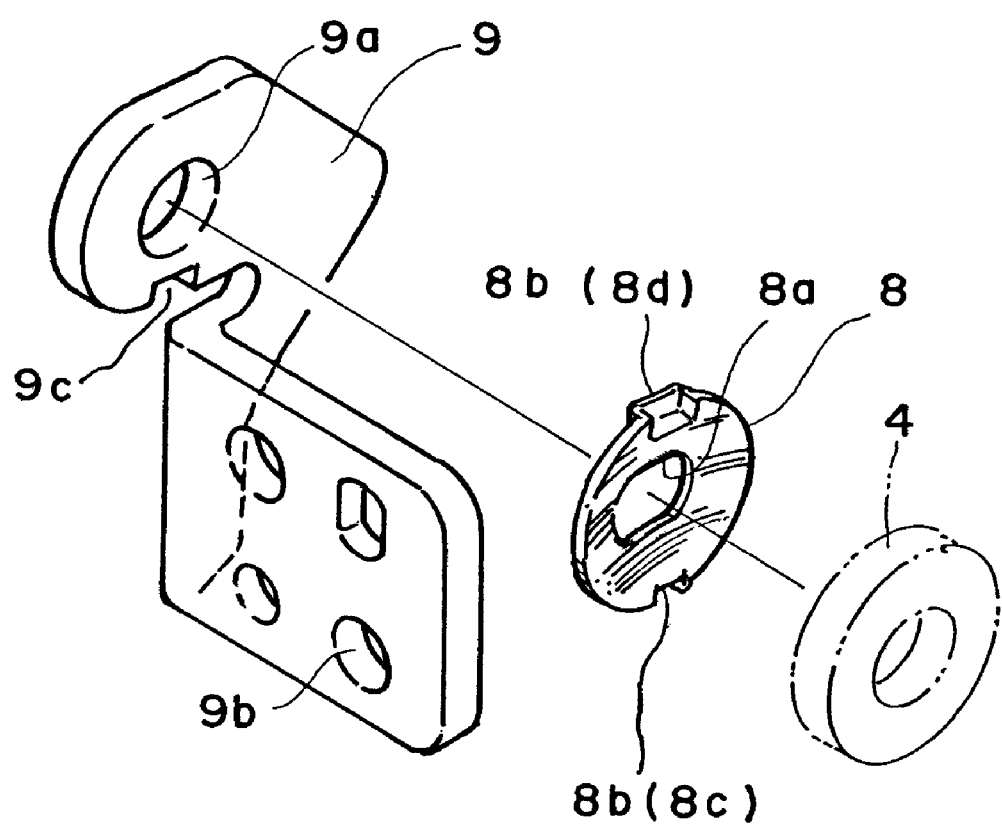
FIG. 17 is an exploded perspective view of a spring washer and a second bracket portion.

FIG. 17 is an exploded perspective view of a spring washer and a second bracket portion. The second bracket 9 has a circular hole 9a corresponding to the main shaft portion 1b of the movable shaft 1, and is rotatably and axially movably fitted onto the main shaft portion 1b of the movable shaft 1. The second bracket 9 of this example is equipped with a cutout 9c in which that projection 8b of the spring washer 8 whose flat portion 8c has a smaller area drops, and screw holes 9b for fixation to the other member, for example, to the main body. Unlike the second bracket of the first embodiment, the second bracket 9 of this embodiment has only one cutout 9c. In the third embodiment, that projection 8b of the spring washer 8 whose flat portion 8d has a larger area does not drop in the cutout 9c since the area of the flat portion 8d is larger than the opening of the cutout 9c of the second bracket 9. It is only the projection 8b whose flat portion 8c has a smaller area that drops in the cutout 9c.

The first bracket 5 is fixed to one member, such as a cover member, and the second bracket 9 is fixed to the other member, such as the main body; when the cover member is opened or closed, the movable shaft 1 rotates with respect to the second bracket 9 through the first bracket 5, and as a result of this rotation of the movable shaft 1, the spring washer 8, the friction washer 3, and the presser washer 4 rotate together. At this time, the spring washer 8 and the friction washer 3 abut both side surfaces of the second bracket 9 while pressed against and held in contact with the same, so rotational torque is generated due to the mutual frictional force; as in the first embodiment, due to this rotational torque, it is possible to control the opening/closing (opening/closing, stopping, and retaining) of the cover member.

Figure 15:
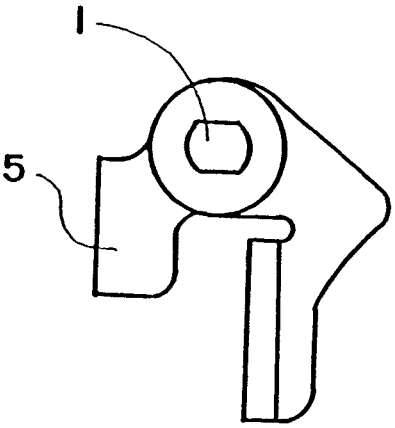
FIG. 15($a$) is a side view, FIG. 15($b$) is a front view, and FIG. 15($c$) is a bottom view of a hinge device according to a third embodiment of the present invention.
Figure 15:
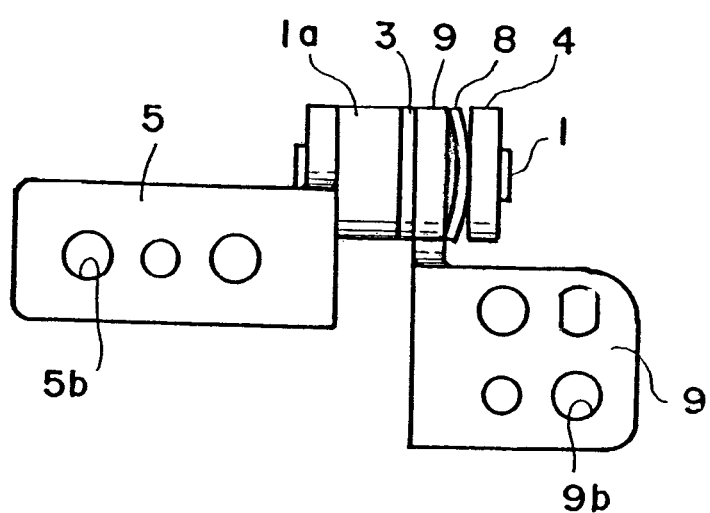
Figure 15:
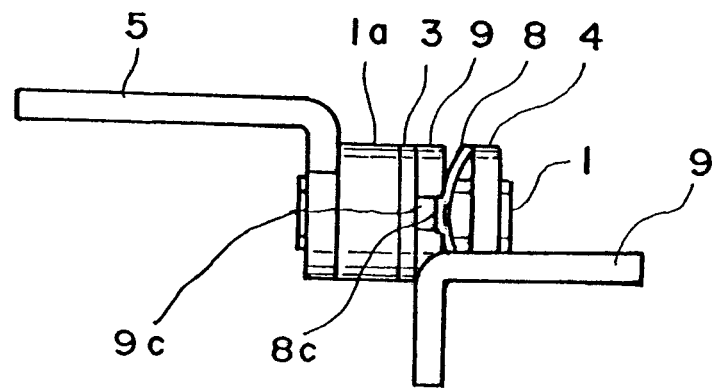
Figure 18:
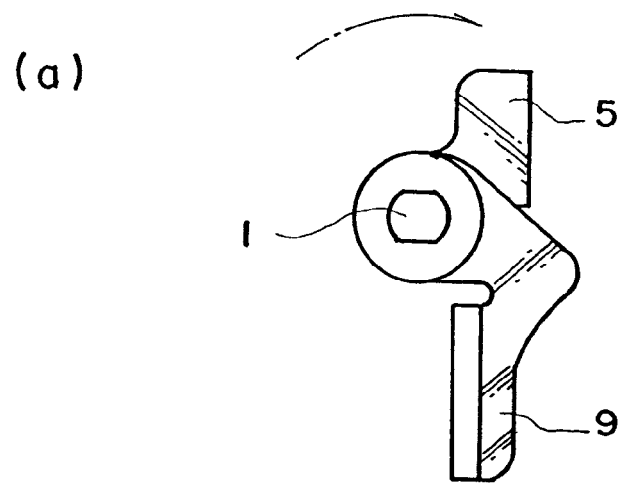
FIG. 18($a$) is a side view, FIG. 18($b$) is a front view, and FIG. 18($c$) is a bottom view showing how, in the hinge device of the third embodiment of the present invention, a projection of the spring washer does not drop in even when it is matched with the recess or the like of the second bracket.
Figure 18:
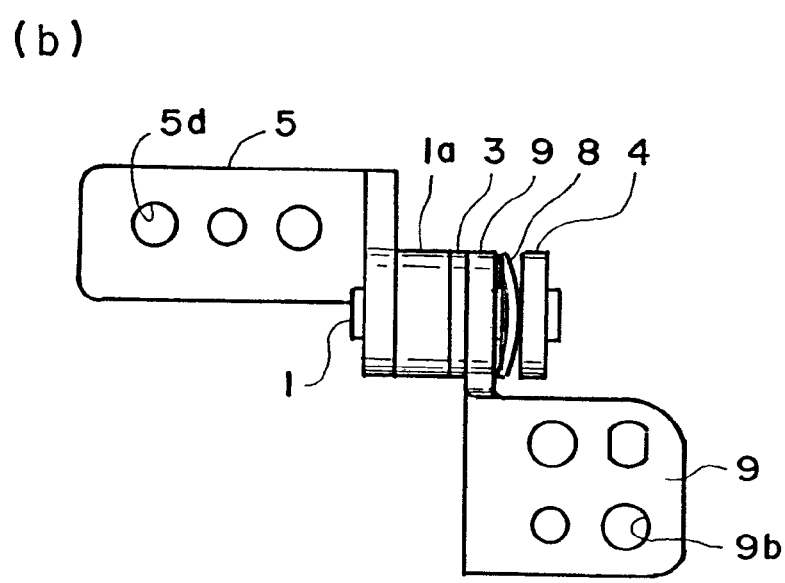
Figure 18:
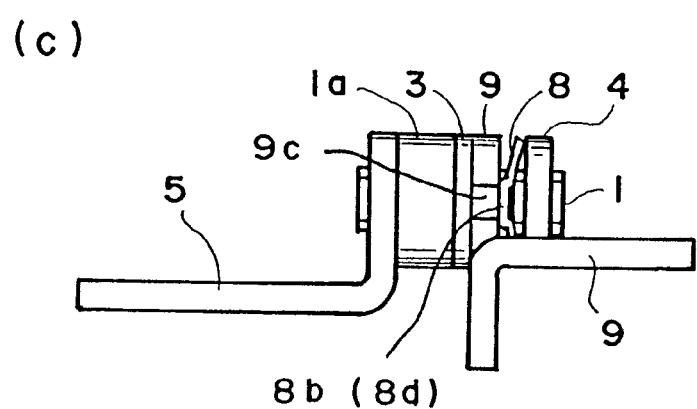

In the third embodiment, when the projection 8b of the spring washer 8 whose flat portion 8c has a smaller area is matched with the cutout 9c of the second bracket 9 as a result of the rotation of the cover member to open or close the same, the projection drops in the cutout 9c, and the rotational torque is changed; restoring the projection 8b of the spring washer 8 in the dropped state onto the plane of the second bracket involves generation of large rotational torque (operating force); however, if the projection 8b of the spring washer 8 whose flat portion 8d has a larger area is matched with the cutout 9c of the second bracket 9, it does not drop in the cutout 9c. FIG. 15 shows the projection 8b (with the flat portion 8c) of the spring washer 8 as dropped in the cutout 9c of the second bracket 9. FIG. 18 (a) is a side view, FIG. 18(b) is a front view, and FIG. 18(c) is a bottom view showing the projection 8b (with the flat portion 8d) of the spring washer 8 as passing the cutout 9c of the second bracket 9 without dropping therein. FIG. 15(c) clearly shows the projection 8b (with the flat portion 8c) as dropped in the cutout 9c of the second bracket 9, and FIG. 18(c) clearly shows the projection 8b (with the flat portion 8d) of the spring washer 8 as passing the cutout 9c of the second bracket 9 without dropping therein.

Thus, in the third embodiment, the rotational torque is changed, in other words, a tactile feel is generated, when the projection 8b of the spring washer 8 whose flat portion 8c has a smaller area drops in the cutout 9c of the second bracket 9, and when the projection 8b dropped in the cutout 9c is restored onto the plane of the second bracket. However, if the projection 8b of the spring washer 8 whose flat portion 8d has a larger area is matched with the cutout 9c of the second bracket 9, it does not drop in the cutout 9c, so there is no change in rotational torque, that is, no tactile feel, thus allowing a smooth movement (see FIG. 18).

Thus, when the position where the tactile feel is to be generated is set, for example, at the closed position of the cover member, it is possible to generate a force in the closing direction when closing the cover member; for example, when the device is applied to a notebook computer, there is no need to provide a latch mechanism for keeping the cover member closed, whereby it is possible to make the computer more compact, and to achieve an increase in the degree of freedom in terms of design. Further, at the other, totally open position, spaced apart therefrom by 180°, no tactile feel is generated, whereby an improvement is achieved in terms of operability.

Figure 19:
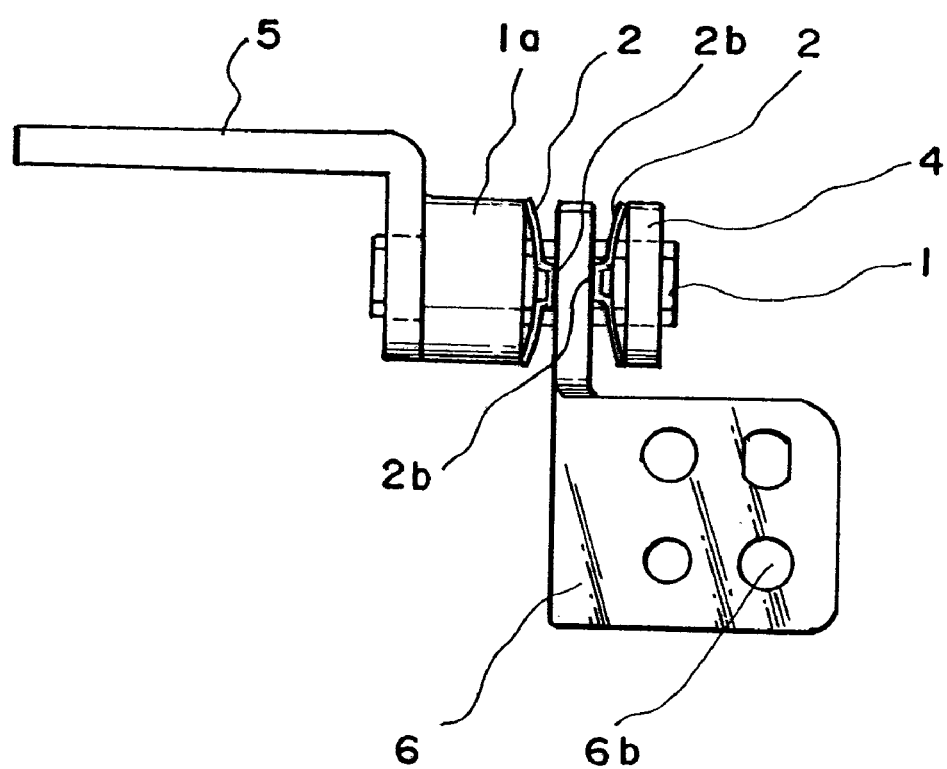
FIG. 19 is a front view of a hinge device according to a fourth embodiment of the present invention.

FIG. 19 is a front view of a hinge device according to a fourth embodiment of the present invention. In this embodiment, the spring washers 2 are provided on both sides of the second bracket 6 so as to sandwich the second bracket; otherwise, this embodiment is the same as the first embodiment, so the same components are indicated by the same reference numerals, and a detailed description thereof will be omitted.

In this embodiment, the spring washers 2 exist on both sides of the second bracket 6, so it is possible to generate rotational torque due to mutual frictional force on both sides of the second bracket 6, thus making it possible to generate large rotational torque. Further, it is possible to generate a tactile feel solely between the second bracket 6 and the spring washer 2 existing on one side of the second bracket 6, or to generate a tactile feel between the second bracket 6 and the spring washers 2 existing on both sides of the same. Regarding the positions where a tactile feel is to be generated between the second bracket 6 and the spring washers 2 existing on both sides thereof, they may be made the same or different according to the positions of the recesses or the like of the second bracket 6 and the positions of the projections 2b of the spring washers 2. It is thus possible to selectively increase the tactile feel generation.

The above-described embodiments do not restrict the present invention, which allows various modifications without departing from the gist thereof. For example, it is possible to eliminate the friction washer as the friction member. Further, it is also possible to eliminate the recess or the like of the second bracket. In this case, there is provided a hinge device function (opening/closing, stopping, and retaining) without any tactile feel.

INDUSTRIAL APPLICABILITY

As described above, the hinge device according to the present invention is suitable for use as a hinge device for connecting one member with the other member so as to allow opening and closing; in particular, it is suitable for use, for example, as a hinge device for connecting the main body and the cover member of a small OA apparatus, a portable terminal apparatus or the like, such as a notebook computer or a mobile phone, so as to allow opening and closing, or as a hinge device for connecting a stool, a toilet seat, and the cover member thereof so as to allow opening and closing.

The invention claimed is:

1. A hinge device for connecting one member and another member so that the hinge device allows opening and closing, the hinge device comprising:
   a movable shaft;
   a first bracket non-rotatably fixed to the movable shaft and fixed to the one member;
   a second bracket rotatably and axially movably installed on the movable shaft and fixed to the another member;
   a presser washer; and
   a plate spring member formed in a curved configuration, said plate spring member having a projection at a top of the curved configuration of the plate spring member, said projection having a flat surface in contact with the second bracket, and said plate spring member being non-rotatably and axially movably installed on the movable shaft, said second bracket and said plate spring member being pressed against and held in contact with each other via said presser washer and said plate spring member being rotatable relative to said second bracket via rotation of said movable shaft.

2. A hinge device according to claim 1, wherein the second bracket, which is pressed against, held in contact, and make the relative rotation with the plate spring member, is provided with one or a plurality of recesses, holes, or cutouts in which the projection of the plate spring member drops, and a tactile feel is generated when the projection of the plate spring member is matched with the recesses, holes, or the cutouts as the second bracket and the plate spring member make relative rotation while pressed against and held in contact with each other.

3. A hinge device according to claim 1, wherein one said plate spring member is arranged on one side of said second bracket and another said plate spring member is arranged on another side of said second bracket, said one said plate spring member and said another said plate spring member being non-rotatably and axially movably installed on the movable shaft so that said one said plate spring member and said another said plate spring member sandwich the second bracket from both sides.

4. A hinge device according to claim 1, wherein the plate spring member has at the top of the curved configuration of the plate spring member at least two said projections whose surfaces in contact with the second bracket are flat, with areas of the flat surfaces being different from projection to projection.

5. A hinge device according to claim 1, wherein the plate spring member is provided with a reinforcing plate spring member stacked on the plate spring member.

6. A hinge device for connecting one member and another member so that the hinge device allows opening and closing, the hinge device comprising:
   a movable shaft;
   a first bracket non-rotatably fixed to the movable shaft and fixed to the one member;
   a second bracket rotatably and axially movably installed on the movable shaft and fixed to the another member;
   a plate spring member formed in a curved configuration, said plate spring member having a projection at a top of the curved configuration of the plate spring member, said projection having a flat surface in contact with the second bracket, and said plate spring member being non-rotatably and axially movably installed on the movable shaft;
   a presser washer; and
   a friction member non-rotatably and axially movably installed on the movable shaft, wherein the plate spring member and the friction member are installed so that the plate spring member and the friction member sandwich the second bracket and are pressed against and held in contact with the second bracket via said presser washer and said plate spring member and said friction member are rotatable with respect to said second bracket via rotation of said movable shaft.

7. A hinge device for connecting one member and another member so that the hinge device allows opening and closing, the hinge device comprising:
   a movable shaft;
   a first bracket fixed to the movable shaft and fixed to the one member, wherein said first bracket does not rotate with respect to said movable shaft;
   a second bracket fixed to the another member, said second bracket being connected to said shaft, wherein said second bracket is rotatable and axially movable with respect to said shaft;
   a presser washer; and
   a plate spring member, said plate spring member having an outer surface defining at least one projection, said projection having a flat surface, said plate spring member being connected to said movable shaft, said plate spring not being rotatable with respect to said movable shaft, said plate spring member being axially movable on said movable shaft, said second bracket and said plate spring member being pressed against and held in contact with each other via said presser washer, said plate spring member being rotatable relative to said second bracket via rotation of said movable shaft.

8. A hinge device according to claim 7, wherein the second bracket comprises one or more recesses, holes, or cutouts, said projection being movable from a first position to a second position, said projection being in contact with a surface of said second bracket in said first position, said one or more recesses, holes, or cutouts receiving said projection in said second position.

9. A hinge device according to claim 8, wherein said plate spring member has at least two said projections, each of said at least two said projections having a flat surface, wherein an area of said flat surface of one of said projections is different from an area of said flat surface of another one of said projections, one of said recesses, holes, or cutouts receiving said one of said projections with said one of said projections in said second position, another one of said recesses, holes, or cutouts receiving said another one of said projections with said another one of said projections in said second position.

10. A hinge device according to claim 7, wherein said plate spring member is arranged on one side of said second bracket and another plate spring member is arranged on another side of said second bracket, said plate spring member and said another plate spring member being non-rotatably and axially movably connected to the movable shaft.

11. A hinge device according to claim 7, wherein said plate spring member is provided with a reinforcing plate spring member stacked on the plate spring member.

* * * * *